(12) United States Patent
Ehrmann-Patin et al.

(10) Patent No.: US 7,058,005 B2
(45) Date of Patent: Jun. 6, 2006

(54) METHOD AND DEVICE FOR TRANSMITTING HIERARCHICAL DATA

(75) Inventors: Frédérique Ehrmann-Patin, Rennes (FR); François Thoumy, Vignoc (FR)

(73) Assignee: Canon Kabushiki Kaisha, Tokyo (JP)

(*) Notice: Subject to any disclaimer, the term of this patent is extended or adjusted under 35 U.S.C. 154(b) by 948 days.

(21) Appl. No.: 09/969,796

(22) Filed: Oct. 4, 2001

(65) Prior Publication Data

US 2002/0085486 A1 Jul. 4, 2002

(30) Foreign Application Priority Data

Nov. 13, 2000 (FR) .................................. 00 14537

(51) Int. Cl.
*H04J 11/00* (2006.01)
(52) U.S. Cl. ..................................... 370/208; 370/210
(58) Field of Classification Search ................ 370/203, 370/208, 210, 470, 482, 506, 295, 281, 319, 370/330, 344, 436; 375/242, 260, 262, 265, 375/324, 340, 341
See application file for complete search history.

(56) References Cited

U.S. PATENT DOCUMENTS

| | | | | |
|---|---|---|---|---|
| 6,115,354 A | * | 9/2000 | Weck | ........................ 370/203 |
| 6,563,881 B1 | | 5/2003 | Sakoda et al. | .............. 375/260 |

FOREIGN PATENT DOCUMENTS

| | | |
|---|---|---|
| EP | 0 673 131 A2 | 9/1995 |
| EP | 0 869 647 A2 | 10/1998 |
| GB | 2 291 314 A | 1/1996 |
| JP | 8-88617 | 4/1996 |
| JP | 8-331093 | 12/1996 |
| JP | 10-173625 | 6/1998 |

OTHER PUBLICATIONS

Horvath, L., et al., "A Novel, High-Speed, Reconfigurable Demapper-Symbol Deinterleaver Architecture For DVB-T", Proceedings of the 1999 IEEE International Symposium on Circuits and Systems VLSI, vol. 4, May 30, 1999-Jun. 2, 1999, pp. 382-385.

* cited by examiner

*Primary Examiner*—Brenda Pham
(74) *Attorney, Agent, or Firm*—Fitzpatrick, Cella, Harper & Scinto

(57) ABSTRACT

In a data transmission method, said data are organized in blocks of K frames, each of said frames being composed of N binary words, each of these binary words being associated with an "elementary symbol". Each of the M=K·N elementary symbols per block modulates a different sub-carrier amongst a series of sub-carriers forming an OFDM modulation, the allocation of each elementary symbol to a given sub-carrier being effected so that, when the OFDM signal is demodulated after it is received, a chosen subset is extracted from amongst said K frames. Application to the transmission of data representing compressed images in accordance with the JPEG2000 standard.

19 Claims, 5 Drawing Sheets

METHOD AND DEVICE FOR TRANSMITTING HIERARCHICAL DATA

Figure 1:
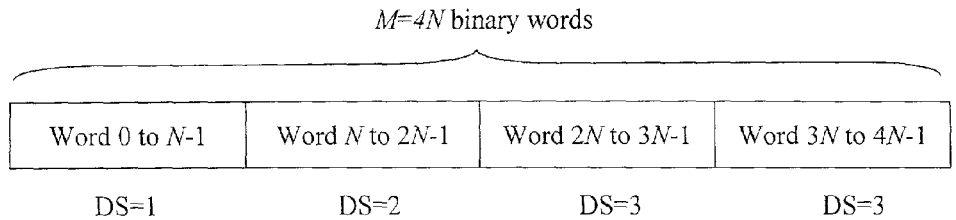

The present invention concerns a method and device for transmitting digital data, designed for situations where the source transmits data representing information of several different types.

Many methods are known for transmitting digital data. For example, it is possible to use a signal serving as a "carrier", whose phase is modulated (this being called "Phase Shift Keying" or "PSK"), or whose phase and amplitude are modulated in combination (this being called "Quadrature Amplitude Modulation" or "QAM"); to do this, there is associated, according to a certain bijection, with any binary word consisting of a predetermined number of bits to be transmitted, a complex number called "symbol"; this symbol, after multiplication by the periodic function of time associated with said carrier, yields the so-called "modulated signal".

However, modern requirements with regard to the broadcasting of information necessitate the choice of transmission methods capable of dealing with high data transmission rates. In other words, the transmission methods used, considered now in frequency space, must offer a broad bandwidth. However, in the face of increasing demands with regard to data transmission rate, it is rapidly becoming impossible, in cases where conventional methods use a signal channel, to guarantee that the channel has identical amplitude and phase characteristics over the entire spectrum of frequencies making up the bandwidth. These distortions cause interference between the data transmitted, which must be countered in an extremely complex manner with an equalization device.

One possibility for resolving this problem is to distribute the signal to be transmitted over a large number of sub-carriers in parallel, individually modulated by only a fraction of the data to be transmitted. The transmission rate being low for each individual sub-carrier, each associated bandwidth is smaller than the overall bandwidth, and therefore there is less risk of the amplitude and phase characteristics varying over the frequency spectrum making up each individual bandwidth. It is thus possible to offer a good transmission quality at high throughput, at the cost obviously of multiplication of the resources used.

On the other hand, there are in practice various technical situations in which the data to be transmitted naturally lend themselves to classification according to different types. One finds for example such a source during the transmission of data representing a voice message, since it is possible to classify the corresponding information in several suitable types (different parts of the audible spectrum, etc) according to their relative importance with regard to the intelligible reconstitution of the voice message. Another example is provided by modern image compression techniques such as JPEG2000, SPIHT or EZW; in these techniques, the user can specify, before the compression is effected, the file size which each compressed image must have; an incorporated coding module is then responsible for eliminating some of the data frames making up the image, so that on the one hand the total size of the file obtained is equal to the specified value and on the other hand the frames kept make it possible to reconstitute the original image as faithfully as possible in spite of the loss of information resulting from the elimination of certain frames.

If in general terms such a classification is effected with regard to a data source, the result will be that one or other type of information will have a more or less great interest for a given recipient of the transmission. This recipient could then choose, leaving aside the less important data, to obtain a decoded message of inferior quality but nevertheless acceptable, if in exchange for this loss of quality said recipient could make savings with regard to the signal reception device. As for the sender of these messages, he could thus offer their recipients a quality of service which is adjustable according to the requirements of each one.

To this end, the present inventors have wondered whether it would be possible to take advantage of "multi-carrier" systems, by modulating a different sub-carrier for each type of data, so as to enable any recipient to make savings by not demodulating the sub-carriers conveying information of lesser importance in his eyes. However, to do this, the recipient must be in a position to extract the "important" sub-carriers from the signal before effecting the demodulation of the signal.

It would for example be possible to envisage allocating to each type of data a sub-carrier frequency which would be all the higher, the greater the hierarchical importance of the data; the recipient could then extract the sub-carriers which he wishes to keep using a high-pass filter having a cutoff frequency adjusted to the appropriate value. However, such a method would have serious drawbacks: this is because, as is well known, the filters have a certain frequency roll off instead of a clean cutoff; the result would be either interference between the different types of data, or the need to broadly space the frequencies of the sub-carriers in the total band allocated to them, which would reduce the possible data transmission rate.

The inventors realized that it would in fact be possible to achieve the required aim using multiple sub-carriers, implementing a kind of "digital filtering" instead of the "electrical" filtering mentioned, and more precisely exploiting certain properties of a particular multi-carrier modulation known as "OFDM" (the initials of the English words "Orthogonal Frequency Division Multiplexing").

Thus the invention concerns, according to a first aspect, on the one hand a data transmission method, in which said data are organized at the source in successive blocks of $K=r^q$ frames, where q is a strictly positive integer and r an integer greater than 1, the frames being hierarchical in each block, each of said frames being composed of N binary words of at least one bit, each of these binary words being associated with a complex number, referred to as "elementary symbol", in accordance with a certain amplitude-phase modulation method, said method being remarkable in that each of the $M=K \cdot N$ elementary symbols per block modulates a different sub-carrier amongst a series of sub-carriers forming an OFDM modulation, the allocation of each elementary symbol to a given sub-carrier being effected so that, when the OFDM signal is demodulated after it is received, there is recovered a subset chosen from amongst said K frames correspondingly adjusting the size of the Discrete Fourier Transform used for effecting this demodulation.

Moreover, according to this first aspect of the invention, this concerns correlatively a method of receiving data transmitted as succinctly described above, said method being remarkable in that, when the OFDM signal is demodulated after it is received, the elementary symbols belonging to the $r^p$ frames whose hierarchical ranks are the highest are recovered, using to effect said demodulation a Discrete Fourier Transform of size $N \cdot r^p$.

This is because, as explained in detail in the following description, the OFDM technique uses an Inverse Discrete Fourier Transform (IDFT) for modulation, and a Discrete Fourier Transform (DFT) for demodulation. By virtue of the invention, each recipient can extract the data which interests him, simply by adjusting accordingly the "size" of the DFT, that is to say the number of sub-carriers thus selected.

In general terms, the hierarchical rank of the frames will be identified conveniently by means of a parameter which will be referred to as "DS" (in English "Data Significance"). Thus the smallest DFT matrix, equal to N, makes it possible according to the invention to recover the elementary symbols contained in the frame of maximum size, associated with DS=1. The following larger DFT matrix makes it possible to recover, in addition to the frame associated with DS=1, a certain number of frames of lesser importance associated with DS=2. The following DFT matrices are defined in a similar manner until the matrix of maximum size is reached, equal to M, which obviously makes it possible to recover all the elementary symbols of each block of data.

The method according to the invention will be particularly advantageous where the number K of frames per block is a power of 2. This is because the IDFT and/or the DFT according to the invention can in this case be implemented in the form of "Fast Fourier Transforms" which, as is well known to experts, are very effective techniques.

It will be observed that the method according to the invention requires a judicious allocation of the elementary symbols. This is because, each time the size of the DFT is divided by r, only the first sub-carrier of each group of r sub-carriers is preserved along the total bandwidth allocated. The elementary symbols can therefore not be allocated, while following the hierarchical rank of the frames, to the different sub-carriers according to the successive frequencies, but must be suitably interleaved.

It is then convenient, according to particular characteristics of the invention, in its first aspect, to define this allocation of elementary symbols to said series of sub-carriers, by means of the following successive steps:

the first step consists of allocating the elementary symbols of the frame of maximum hierarchical rank, and each new step is associated with an integer p successively taking the values 1 to q, and consists of allocating the elementary symbols of ($r^p - r^{p-1}$) new frames whose hierarchical rank is lower than the rank of the frames allocated at the previous step, each step consisting of:

allocating the elementary symbols of said new frames to the sub-carriers whose serial numbers are multiples of HP commencing with the first sub-carrier, which carries the serial number zero, to the exclusion of the non-available sub-carriers, that is to say those to which an elementary symbol has already been allocated during a previous step, allocating all the elementary symbols of each frame before allocating the elementary symbols of another frame, and allocating the first elementary symbol of each frame to the sub-carrier having the lowest serial number amongst those which are available.

According to particular supplementary characteristics, the successive elementary symbols of each frame are allocated to sub-carriers for which the difference in the serial numbers is a multiple of K.

According to other supplementary particular characteristics, the allocation of the successive frames follows, within each hierarchical rank, the order of the frames at the source.

It should be noted that, after reception and extraction of the required sub-carriers, it is also necessary to deinterleave the elementary symbols in order to reconstitute each extracted frame as it was at the source. This is because, as will easily be seen from a reading of the examples proposed below, the elementary symbols obtained in accordance with the invention are not in the order in which they were before their interleaving (except in the case where only one frame is extracted).

According to a second of its aspects, the invention concerns various devices taking into account the interleaving and deinterleaving involved in the transmission method according to the invention.

This thus concerns firstly a device for interleaving data intended to be transmitted by means of a method as succinctly described above, said device being remarkable in that it has:

means for storing or calculating the permutation leading to said interleaving of the M elementary symbols per block, and means for allocating, in accordance with this permutation, each elementary symbol to the corresponding sub-carrier in order to modulate it.

Correlatively, the invention concerns secondly a device for deinterleaving data which have been received by means of a method as succinctly described above, said device being remarkable in that it has:

means for storing or calculating the permutation required for putting the elementary symbols resulting from said demodulation back in the order in which they were, at the source, in their respective frames, and means for recovering, in accordance with this permutation, said elementary symbols from the sub-carriers at the time of said demodulation.

The invention concerns thirdly a signal modulation device, said device being remarkable in that it includes:

at least one data interleaving device as succinctly described above, and at least one OFDM modulator.

Correlatively, the invention concerns fourthly a signal demodulation device, said device being remarkable in that it includes:

at least one OFDM demodulator, and at least one data deinterleaving device as succinctly described above.

The present invention also relates to:

a modulated signal transmission apparatus having a signal modulation device as succinctly described above, and means for transmitting said signal, a modulated signal reception apparatus having a signal demodulation device as succinctly described above, and means for receiving said signal, a telecommunications network including at least one apparatus as succinctly described above, a data storage means which can be read by a computer or microprocessor storing instructions of a computer program, making it possible to implement one of the methods succinctly disclosed above, a means of storing data, partially or totally removable, which can be read by a computer and/or microprocessor storing instructions of a computer program, making it possible to implement one of the methods succinctly disclosed above, and a computer program, containing instructions such that, when said program controls a programmable data processing device, said instructions mean that said data processing device implements one of the methods succinctly disclosed above.

The advantages offered by these appliances, telecommunications networks, data storage means and computer programs are essentially the same as those offered by the methods and devices according to the invention.

Figure 2:
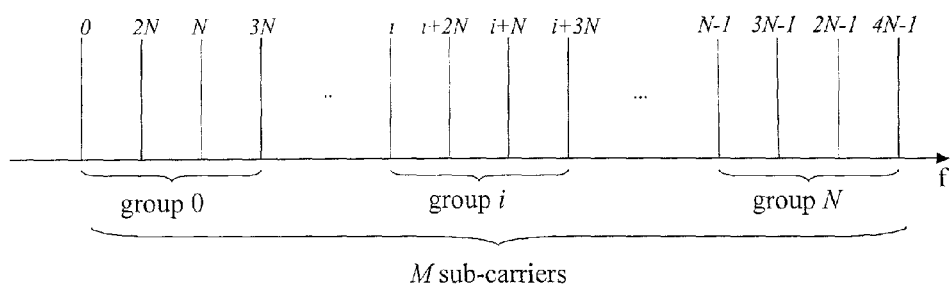
Figure 3:
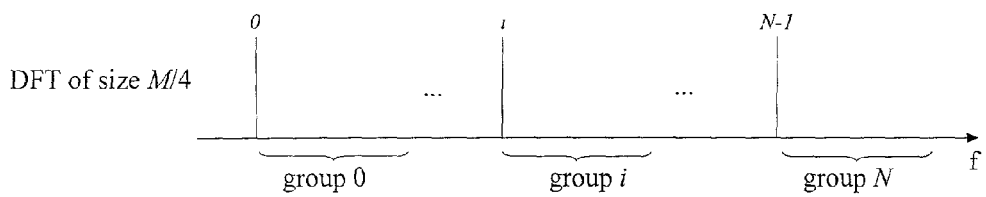
Figure 3:
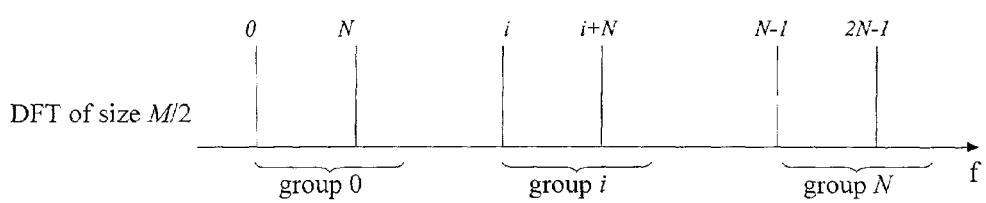
Figure 3:
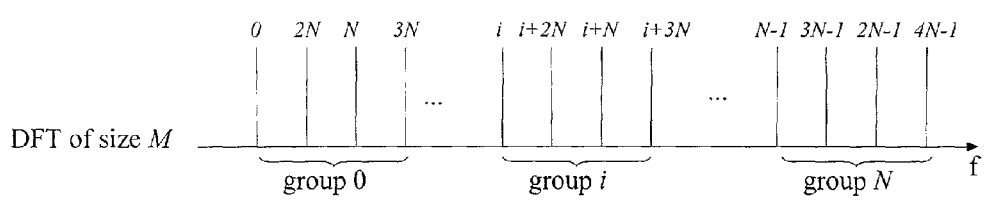
Figure 4:
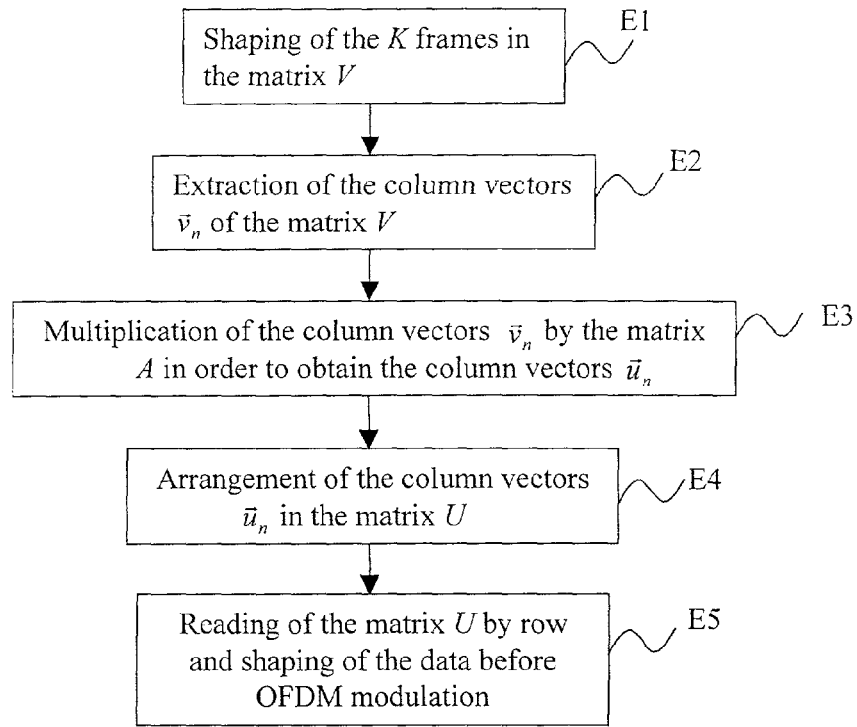
Figure 10:
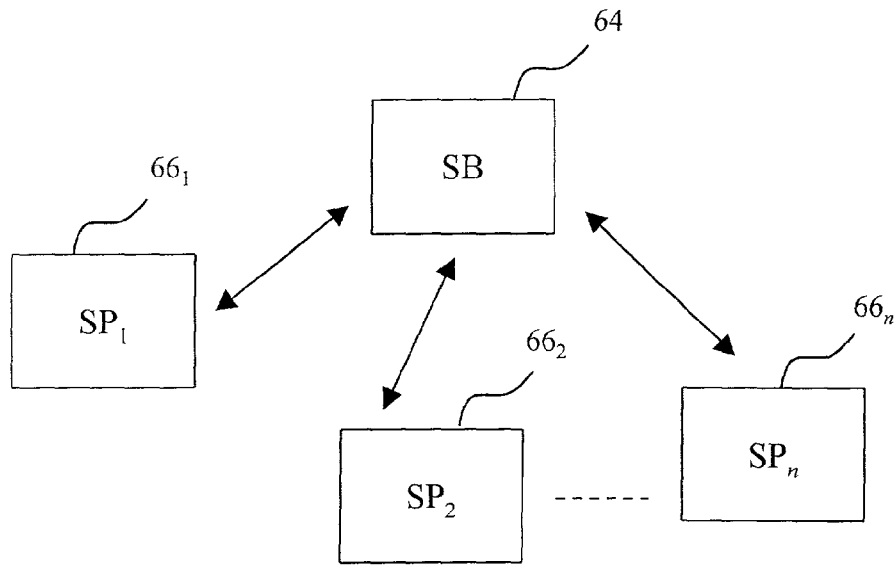
Figure 5:
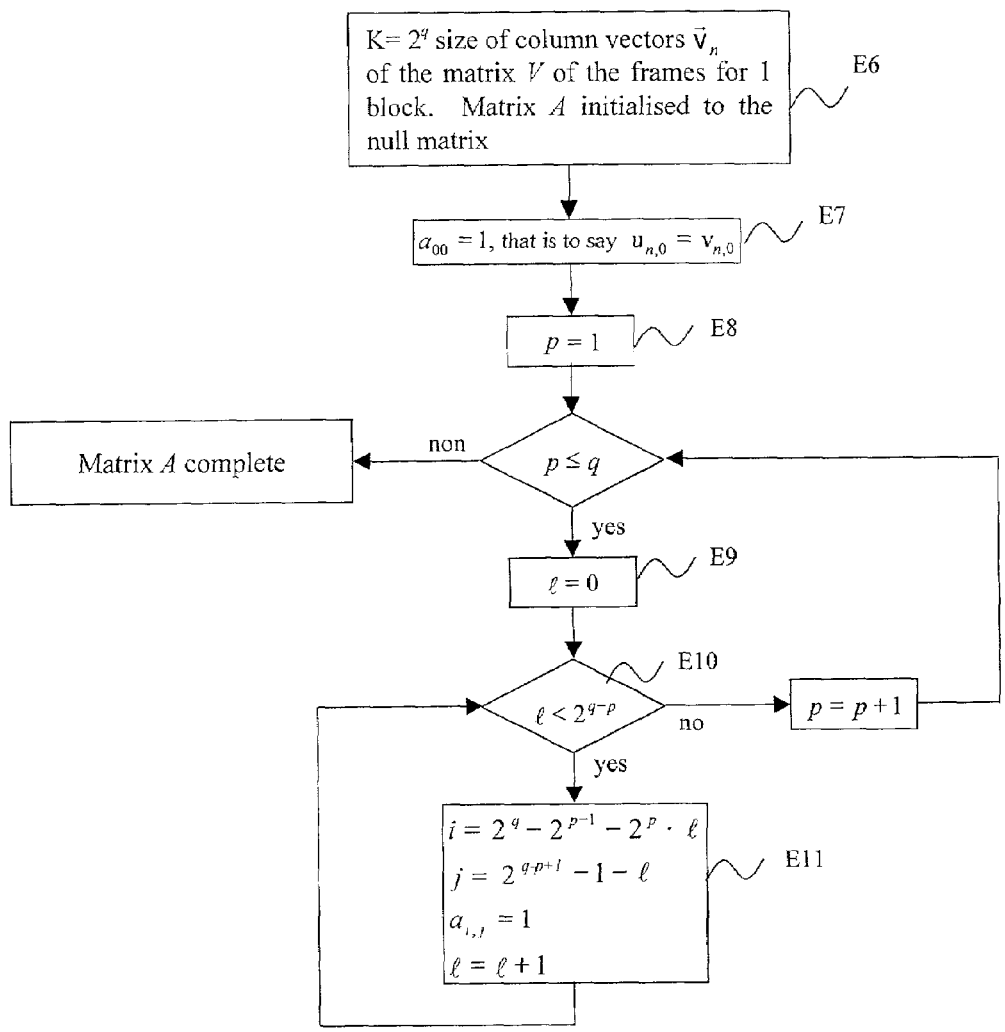
Figure 6:
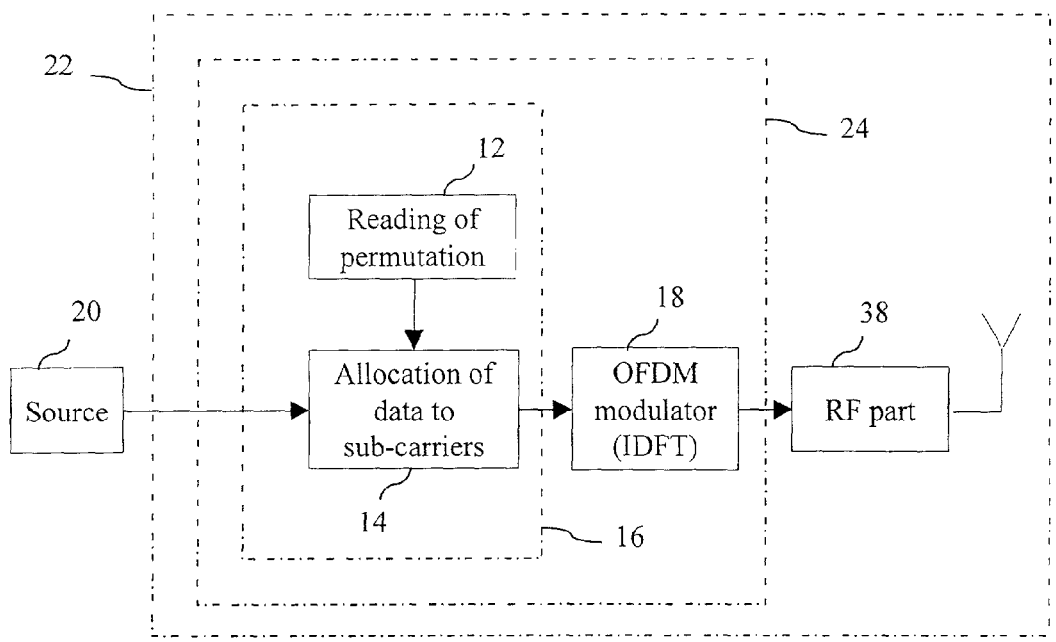
Figure 7:
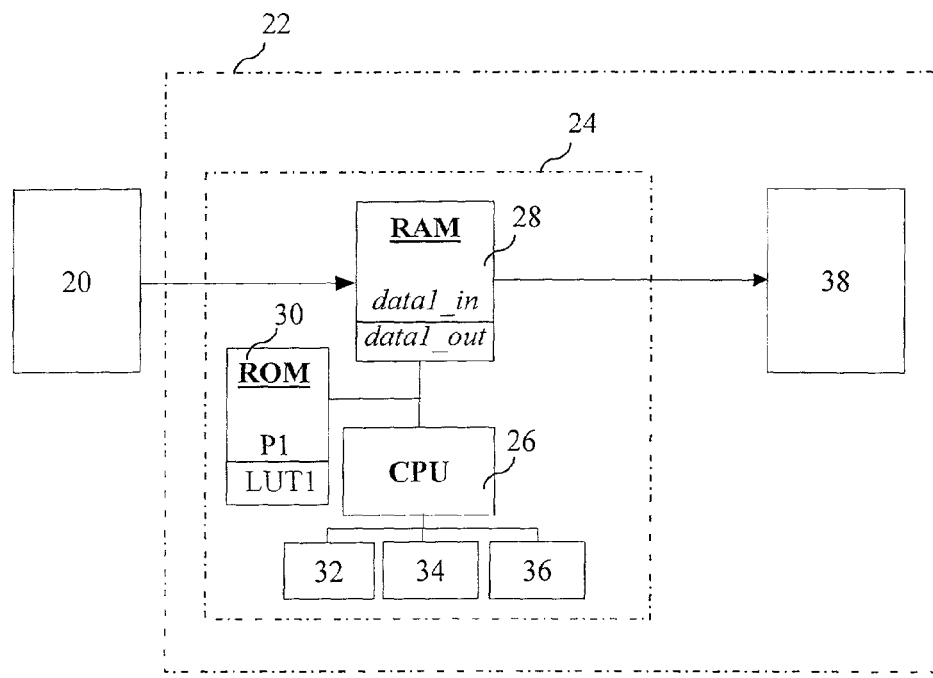
Figure 8:
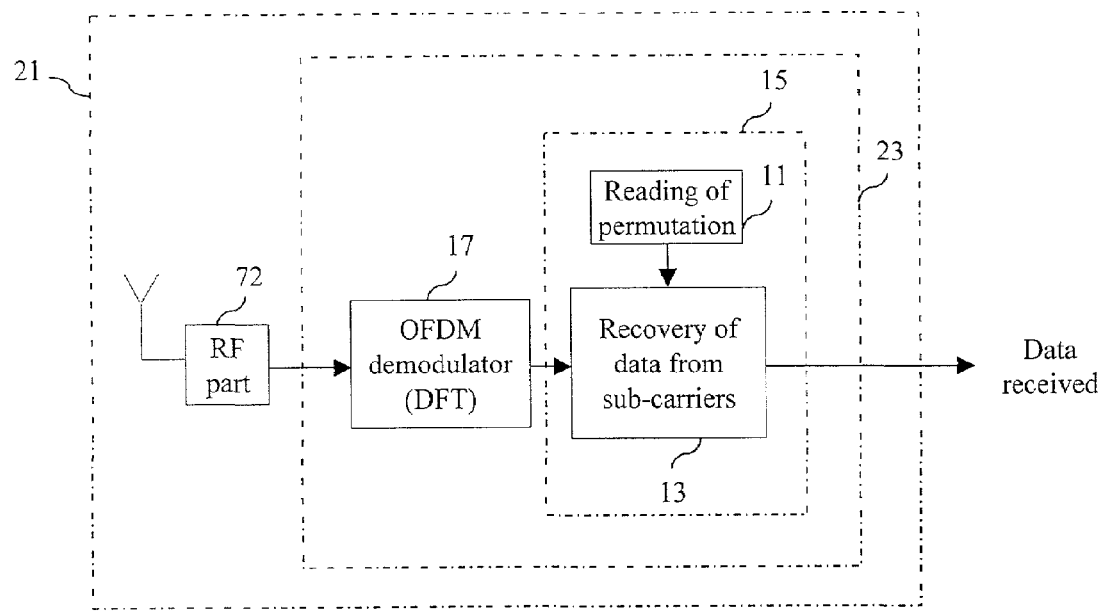
Figure 9:
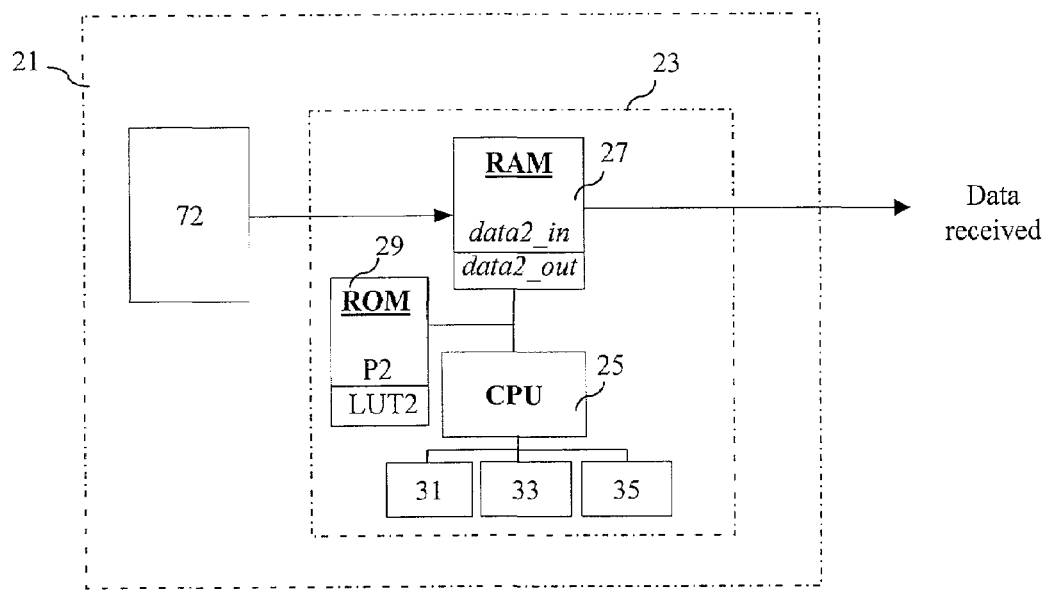

Other aspects and advantages of the invention will emerge from a reading of the following detailed description of particular embodiments, given by way of non-limitative examples. The description refers to the drawings which accompany it, in which:

FIG. 1 depicts a particular hierarchy of data to be transmitted, in which the number of frames per block is 4, FIG. 2 depicts the allocation of the elementary symbols of FIG. 1 to the sub-carriers constituting the OFDM symbol, in accordance with an interleaving according to the invention, FIG. 3 depicts the recovery of the elementary symbols of FIG. 2 according to the size of the DFT, FIG. 4 is a flow diagram representing the main successive steps of an interleaving, according to the invention, of the elementary symbols of each block of data, FIG. 5 is a flow diagram representing the main successive steps of the construction of the matrix A appearing in the flow diagram of FIG. 4, in the particular case where the number of frames per block is a power of 2, FIG. 6 is a block diagram of a modulated signal transmission apparatus according to the invention, FIG. 7 depicts a preferred embodiment of the apparatus of FIG. 6, FIG. 8 is a block diagram of a modulated signal reception apparatus according to the invention, FIG. 9 depicts a preferred embodiment of the apparatus of FIG. 8, and FIG. 10 depicts schematically a wireless telecommunications network able to implement the invention.

It will first of all be stated briefly of what the OFDM modulation consists. The data to be transmitted are first of all expressed in the form of "elementary symbols", that is to say complex numbers $d_i$ in accordance with a certain amplitude-phase modulation method, as explained in the introduction. These elementary symbols are processed by blocks of M elementary symbols, which will each modulate one "sub-carrier" amongst a set of M sub-carriers whose successive frequencies are spaced apart by a predetermined quantity (1/T). There is then constructed, from each block of elementary symbols $d_i$, i=0, ..., (M−1), associated with an interval of time t of duration T:

$$kT \leq t \leq (k+1)T,$$

where k is an integer, an "OFDM symbol" $D_k(t)$ defined by the expression $$D_k(t) = \sum_{i=0}^{M-1} d_i \exp\left[j2\pi \frac{i}{T}(t - kT)\right] \quad (1)$$

in said interval of time, and zero outside this interval.

Mathematically speaking, expression (1) is none other than a discrete Fourier transform. By inverting this Fourier transform after reception of the modulated signal, it is possible to calculate each of the individual elementary symbols of a given block from the OFDM symbol associated with this block.

For more details, reference can be made to the book by R. van Nee and R. Prasad entitled "OFDM for Wireless Multimedia Communications" (Artech House, Boston and London, 2000), or to the thesis by F. Tufvesson entitled "Design of Wireless Communication Systems—Issues on Synchronization, Channel Estimation and Multi-Carrier Systems" (Department of Applied Electronics, University of Lund, Sweden, August 2000).

FIG. 1 depicts a particular hierarchy of data to be transmitted, for example data representing images compressed at the output of a JPEG2000 coder, in which the number K of frames per block is $2^2=4$. The frames constituting the blocks of a given message all comprise the same predetermined number N (a strictly positive integer) of elementary symbols.

The first frame carries a value of DS equal to 1, the second frame a value of DS equal to 2, and the last two frames both bear a value DS equal to 3.

FIG. 2 depicts the allocation of the elementary symbols of FIG. 1 to the sub-carriers constituting the OFDM symbol in accordance with the interleaving according to the invention, which will be described in detail with reference to FIGS. 4 and 5.

The top line in FIG. 2 indicates the number of the elementary symbol in the block in question. The brackets at the bottom of the figure refer to the sub-carriers, which are grouped here 4 by 4: this is because, in this interleaving according to a preferred embodiment of the invention, the successive elementary symbols of each frame are allocated to sub-carriers whose serial numbers differ from K, which is equal to 4 in this case.

FIG. 3 depicts the recovery of the elementary symbols of FIG. 2 according to the size of the DFT, after reception of the signal modulated by OFDM. This figure gives a clear understanding why the elementary symbols have been interleaved, before transmission of the signal modulated by OFDM, as illustrated in FIG. 2.

This is because, using a DFT matrix of size M/4, the recipient can, if he so wishes, recover only the frame of maximum hierarchical rank (DS=1).

By using a DFT matrix of size M/2, the recipient can, if he so wishes, recover only the frame of maximum hierarchical rank (DS=1) and the frame with the hierarchical rank immediately below (DS=2).

Finally, using a DFT matrix of size M, the recipient can, if he so wishes, recover the block of data as a whole (DS=1 to 3). It can be seen that, although the sub-carriers reserved for the last two frames (with DS equal to 3) are well determined, the particular allocation of the elementary symbols of these last two frames to these sub-carriers is of little significance, and can give rise, by agreement between the sender and the recipient of the message, to several different interleaving methods within the present invention.

It can also be seen that, with the exception of the case where the recipient recovers only one frame, it will be necessary for him to deinterleave the elementary symbols in order to reconstitute the original message (at the chosen quality level).

On the basis of this example, it will be understood how the method according to the invention can be extended to the values of K equal to $r^q$, where q is any strictly positive integer and r any integer greater than 1. The purpose of the interleaving is to be able to choose, when the signal modulated by OFDM is received, between (1+q) different DFT matrices of size $N \cdot r^p$, where p is between 0 and q. Each of these DFT's makes it possible to extract from the received signal complete frames where the values of DS range from 1 up to a maximum value equal to (p+1).

If the recipient considers that the frames of DS greater than (p+1), where p is less than (M−1), are not essential to him for obtaining an intelligible message, or, more generally, a message of sufficient quality as he sees it, he can dispense with demodulating M carriers, as he should do with the conventional transmission methods. He can thus, according to the invention, make savings in time and/or equipment.

A series of steps making it possible to arrive at a suitable interleaving of the elementary symbols of each block of data in the general case ($K=r^q$) has already been succinctly described above.

FIG. 4 illustrates the main steps of a matrix method which is particularly convenient for arriving at the same result. At step E1, the K frames of N elementary symbols are arranged in an matrix $$V = \begin{pmatrix} v_{0,0} & \cdots & v_{N-1,0} \\ \vdots & \ddots & \vdots \\ v_{0,K-1} & \cdots & v_{N-1,K-1} \end{pmatrix}$$

of size (K,N) in hierarchical order of importance. The most important frame is on the first line, the frame of least importance is on the last ($K^{th}$) line.

At step E2, the matrix V is read by columns, from the first row to the last, in order to obtain N vectors $\vec{v}_n$, where n varies from 0 to N−1, each having K elements:

$$\vec{v}_n = [v_{n,0} \ldots v_{n,K-1}]^T,$$

where $[.]^T$ means transposition.

At step E3, each vector $\vec{v}_n$ is multiplied by the interleaving matrix A of size (K,K), whose calculation is described with reference to FIG. 5, in order to obtain the vectors $\vec{u}_n$, where n varies from 0 to N−1, each containing K elements:

$$A\vec{v}_n = \vec{u}_n$$

$$\begin{pmatrix} a_{0,0} & \cdots & a_{0,K-1} \\ \vdots & \ddots & \vdots \\ a_{K-1,0} & \cdots & a_{K-1,K-1} \end{pmatrix} \begin{pmatrix} v_{n,0} \\ \vdots \\ v_{n,K-1} \end{pmatrix} = \begin{pmatrix} u_{n,0} \\ \vdots \\ u_{n,K-1} \end{pmatrix},$$

where $\vec{u}_n = [u_{n,0} \ldots u_{n,K-1}]^T$.

At step E4, the vectors $\vec{u}_n$ are arranged in columns in a matrix U of size (K,N) putting the first component $u_{n,0}$ of each vector on the first row, and the last ($K^{th}$) component $u_{n,K-1}$ on the last row (the reverse of step E2):

$$U = \begin{pmatrix} u_{0,0} & \cdots & u_{N-1,0} \\ \vdots & \ddots & \vdots \\ u_{0,K-1} & \cdots & u_{N-1,K-1} \end{pmatrix}.$$

At step E5, the matrix U of size (K,N) is read by line, in order to obtain a line vector of length K·N=M whose complex components will modulate the M sub-carriers of an OFDM symbol.

FIG. 5 indicates the main successive steps of the construction of the matrix A used in the above step E3, in the particular case where the number of frames per block is a power of 2: $K=2^q$.

In this algorithm, the term $a_{i,j}$ represents the element in the matrix A at the intersection of the $i^{th}$ line and the $j^{th}$ column, i and j varying from 0 to (K−1).

Step E6 is an initialization step. The value of K which indicates the number of elements of the column vectors of the matrix V is read, and the matrix A is initialized with the identically null matrix of size (K,K). The value of q determines the number of iterations required for calculating A.

Step E7 expresses the fact that the order of the most important frame, which always remains on the first row of the matrices V and U, is not modified.

At step E8, the index p is initialized to 1, and a loop is started on this index, which will continue until p reaches the value q.

At step E9, the calculation index l is initialized to 0; this index makes it possible to identify the indices of the rows and columns from the matrix A. A loop is then started on this index, determined by step E10. If this condition is not satisfied, p is incremented by 1, and step E9 is returned to after having checked that p does not exceed q. If the latter condition is also not satisfied, this means that K elements in the matrix A have received the value 1 and that the calculation of A is terminated.

At step E11, by means of the indices p and l, the indices i and j of the sole element of the matrix A which is set to 1 for a given p and l are calculated. This step next increments l in order to set a new element of A to 1, as long as the condition between l, q and p is satisfied.

The advantage of this way of calculating the matrix A is speed; it is not K·K elements in the matrix which are calculated, but only K.

For example, for K=4, the matrix A is as follows:

$$A = \begin{pmatrix} 1 & 0 & 0 & 0 \\ 0 & 0 & 1 & 0 \\ 0 & 1 & 0 & 0 \\ 0 & 0 & 0 & 1 \end{pmatrix},$$

and for K=8:

$$A = \begin{pmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 1 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{pmatrix}.$$

FIG. 6 shows highly schematically a modulated signal transmission apparatus 22 according to the invention.

The data source 20 is for example a database, or a computerized data processing peripheral such as a digital camera, a facsimile machine, a scanner or a digital photographic apparatus. Before entering the apparatus 22, these data have been the subject of a particular processing, for example an image compression according to the JPEG2000 standard, which confers a hierarchical structure on them.

The modulated signal transmission apparatus 22 comprises on the one hand a signal modulation device 24 according to the invention and on the other hand a conventional transmission unit 38 comprising, in this embodiment adapted to a wireless transmission, a radio module including a transmitter, one or more mixers, one or more amplifiers, various filters and a radio antenna.

The signal modulation device 24 comprises on the one hand a convention OFDM modulator 18 and on the other hand a data interleaving device 16 according to the invention.

This data interleaving device 16 comprises a unit 14 responsible for receiving the binary words coming from the source 20, transforming these binary words into elementary symbols in accordance with a predetermined amplitude-phase modulation method, and allocating these elementary symbols to the sub-carriers of the OFDM modulation whilst being guided by the unit 12.

This unit 12 supplies the unit 14 on the basis of a permutation according to the invention, such as the one illustrated in FIG. 4, associating with each elementary symbol number, between 0 and (M−1), by block, a sub-carrier serial number, also between 0 and (M−1). This coupling between numbers can possibly be calculated during the execution of the data transmission method according to the invention, but it can advantageously be calculated before the start of the transmission and stored in a look-up table situated in the unit 12, or to which unit 12 has access.

FIG. 7 depicts a preferred embodiment of the apparatus of FIG. 6.

The signal modulation device 24 comprises, in this embodiment, temporary data storage means such as a random access memory (RAM) 28, permanent data storage means such as a read only memory (ROM) 30, character entry means 32, for example a keyboard, data display means 34, for example a screen, data input/output means 36, and a central processing unit (CPU) 26, for example a microprocessor.

The RAM memory 28 contains notably:
- a memory area "data1_in" in which the input data supplied by the source 20 are temporarily stored, and
- a memory area "data1_out" in which the OFDM symbols constructed according to the invention are temporarily stored, before communicating them to the transmission unit 38.

The ROM memory 30 contains:
- a memory area "P1" in which there is stored a program implementing a data transmission method according to the invention, and
- a memory area "LUT1" in which there is recorded the look-up table mentioned above, associated with an interleaver for the elementary symbols according to the invention.

The block diagram of FIG. 8 shows, highly schematically, a modulated signal reception apparatus 21 according to the invention.

The modulated signal reception apparatus 21 comprises on the one hand a signal demodulation device 23 according to the invention, and on the other hand a conventional reception unit 72 comprising, in this embodiment adapted to a wireless transmission, a radio module including a receiver, one or more mixers, one or more amplifiers, various filters and a radio antenna.

The signal demodulation device 23 comprises on the one hand a conventional OFDM demodulator 17 and on the other hand a data deinterleaving device 15 according to the invention. A user can, in a known manner, adjust the size of the DFT to the OFDM demodulator 17. He thus extracts $N \cdot r^p$ sub-carriers of the signal which was produced with an OFDM modulation taking into account an interleaving according to the invention.

The data deinterleaving device 15 comprises a unit 13 responsible for recovering the elementary symbols from the sub-carriers in a certain order, being guided by the unit 11, and for implementing the demodulation, that is to say transforming these elementary symbols into binary words by reversing said predetermined amplitude-phase modulation.

The unit 11 supplies the unit 13 on the basis of a permutation according to the invention, acting on the extracted sub-carriers so as to be able to insert the elementary symbols in their correct place in the flow transmitted by the unit 13, and thus reconstitute complete data frames in the order in which these data were before they were transmitted. It should be noted that this permutation depends on the size of the DFT chosen, according to the invention, by the user.

For example, in the case, illustrated in FIG. 3, where K is equal to 4, and the size of the DFT is M/2, the elementary symbol number i will be obtained, where i is between 0 and (N−1), by demodulating the sub-carrier which originally bore the serial number 4i, and now bears (amongst the sub-carriers extracted) the serial number 2i; and the elementary symbol number i will be obtained, where i is between N and (2N−1), by demodulating the sub-carrier which originally bore the serial number (4(i−N)+2), and now bears (amongst the extracted sub-carriers) the serial number (2(i−N)+1).

This coupling between each elementary symbol number, between 0 and $(N \cdot r^p - 1)$, per block, and a sub-carrier serial number, can possibly be calculated during the execution of the data reception method according to the invention, but it could advantageously be calculated before the start of the transmission and stored in a look-up table situated in the unit 11, or to which the unit 11 has access.

FIG. 9 depicts a preferred embodiment of the apparatus of FIG. 8.

The signal demodulation device 23 comprises, in this embodiment, temporary data storage means such as a random access memory (RAM) 27, permanent data storage means such as a read only memory (ROM) 29, character entry means 31, for example a keyboard, data display means 33, for example a screen, data input/output means 35, and a central processing unit (CPU) 25, for example a microprocessor.

The RAM memory 27 contains notably:
- a memory area "data2_in" in which the input data supplied by the reception unit 72 are temporarily stored, and
- a memory area "data2_out" in which the binary words of the frames selected and reconstituted according to the invention are temporarily stored before communicating them to the user with a view to an appropriate processing (for example an image decompression according to JPEG2000).

As a variant, these data frames can be stored on a hard disk (not shown) contained in the device 23, so as to use them only later according to requirements.

The ROM memory 29 has:
- a memory area "P2" in which there is recorded a program implementing a data reception method according to the invention, and
- a memory area "LUT2" in which there is recorded the look-up table, mentioned above, associated with a deinterleaving of the elementary symbols according to the invention.

It should be noted that, in certain applications, it will be convenient to use the same computer device (functioning in "dual" mode) for the transmission and reception of signals according to the invention; in this case, the appliances 21 and 22 will be physically identical.

The methods according to the invention can be implemented within a telecommunications network, as shown in FIG. 10. The network depicted, which can for example consist of one of the future communication networks such as the HIPERLAN2 networks, consists of a so-called "base station" SB designated by the reference 64, and several "peripheral" stations $SP_i$ (i=1, . . . , n, where n is an integer greater than or equal to 1), respectively designated by the references $66_1$, $66_2$, . . . , $66_n$. The peripheral stations $66_1$, $66_2$, . . . , $66_n$ are remote from the base station SB, each connected by a radio link with the base station SB and able to move with respect to the latter.

The base station SB and each peripheral station $SP_i$ can comprise a modulated signal transmission apparatus 22 and/or a modulated signal reception apparatus 21 according to the invention.

The base station SB and peripheral stations $SP_i$ can also comprise, according to requirements, a digital camera, a computer, a printer, a server, a facsimile machine, a scanner or a digital photographic apparatus.

The invention claimed is:

1. Data transmission method, wherein data are organized in blocks of K frames, each of the frames being composed of N binary words, each of these binary words being associated with an "elementary symbol", and wherein each of the M=K·N elementary symbols per block modulates a different sub-carrier amongst a series of sub-carriers forming an OFDM modulation, the allocation of each elementary symbol to a given sub-carrier being effected so that, when the OFDM signal is demodulated after it is received, a chosen subset is extracted from amongst the K frames.

2. Data transmission method according to claim 1, wherein said chosen subset is extracted by correspondingly adjusting the size of the Discrete Fourier Transform used for effecting this demodulation.

3. Data transmission method according to claim 1, wherein the data are organized in blocks of $K=2^q$ frames, where q is a strictly positive integer, and the OFDM modulation uses a Fast Inverse Fourier Transform.

4. Data transmission method according to claim 1, wherein the K frames in each block are organized into a hierarchy and $K=r^q$, where q is a strictly positive integer and r an integer greater than 1, and wherein said allocation of elementary symbols to the series of sub-carriers can be defined by means of the following successive steps:
the first step consists of allocating the elementary symbols of the frame of maximum hierarchical rank, and
each new step is associated with an integer p successively taking the values 1 to q, and consists of allocating the elementary symbols of $(r^p-r^{p-1})$ new frames whose hierarchical rank is lower than the rank of the frames allocated at the previous step,
each step consisting of:
allocating the elementary symbols of the new frames to the subcarriers whose serial numbers are multiples of $r^{q-p}$ commencing with the first sub-carrier, which carries the serial number zero, to the exclusion of the nonavailable sub-carriers, that is to say those to which an elementary symbol has already been allocated during a previous step,
allocating all the elementary symbols of each frame before allocating the elementary symbols of another frame, and
allocating the first elementary symbol of each frame to the subcarrier having the lowest serial number amongst those which are available.

5. Data transmission method according to claim 4, wherein the successive elementary symbols of each frame are allocated to sub-carriers for which the difference in their serial numbers is a multiple of K.

6. Data transmission method according to claim 4, wherein the allocation of the successive frames follows, within each hierarchical rank, the order of the frames at the source of these data.

7. Data reception method, wherein data have been transmitted according to claim 4, and wherein, at the time of said demodulation of the OFDM symbol after it is received, the elementary symbols belonging to the $r^p$ frames whose hierarchical ranks are the highest are extracted, using to effect said demodulation a Discrete Fourier Transform of size $N \cdot r^p$.

8. Data reception method according to claim 7, wherein the data are organized in blocks of $K=2^q$ frames, where q is a strictly positive integer, and said OFDM demodulation uses a Fast Fourier Transform.

9. Data storage means which can be read by a computer or a microprocessor storing instructions of a computer program, making it possible to implement a data transmission method according to claim 1.

10. Data storage means which is removable, partially or totally, and which can be read by a computer and/or a microprocessor storing instructions of a computer program, making it possible to implement a data transmission method according to claim 1.

11. Computer program containing instructions such that, when said program controls a programmable data processing device, said instructions mean that said data processing device implements a data transmission method according to claim 1.

12. Device for interleaving data organized in blocks of K frames, each of said frames being composed of N binary words, each of these binary words being associated with an "elementary symbol", said device comprising:
means for storing or calculating the permutation leading to interleaving of the M=K·N elementary symbols per block, and
means for allocating, in accordance with this permutation, each elementary symbol to a different sub-carrier amongst a series of sub-carriers forming an OFDM modulation, means for allocating each elementary symbol to a given sub-carrier being adapted in such a way that, when the OFDM signal is demodulated after it is received, a chosen subset is extracted from amongst said K frames.

13. Device for deinterleaving data, comprising:
means for receiving an OFDM signal comprising for each frame of data a plurality of elementary symbols modulating each a different sub-carrier, the data being organized in blocks of K frames, each of the frames being composed of N binary words, each of them being associated with one of the M=K·N elementary symbols per block of data,
means for demodulating the OFDM signal including means for extracting a chosen subset of elementary symbols from amongst the K frames,
means for storing or calculating a permutation required for putting the elementary symbols resulting from the demodulation back in the order in which they were, at the source, in their respective frames, and
means for recovering, in accordance with this permutation the elementary symbols from the sub-carriers at the time of the demodulation.

14. Signal modulation device, comprising:
at least one data interleaving device according to claim 12, and
at least one OFDM modulator.

15. Signal demodulation device, comprising:
  at least one OFDM demodulator, and
  at least one data deinterleaving device according to claim 13.

16. Modulated signal transmission apparatus, comprising a signal modulation device comprising:
  at least one data interleaving device according to claim 12,
  at least one OFDM modulator, and
  means for transmitting a signal thus modulated.

17. Modulated signal reception apparatus, comprising:
  means for receiving a modulated signal and a signal demodulation device, comprising:
  at least one OFDM demodulator, and
  at least one data deinterleaving device according to claim 13.

18. Telecommunications network, comprising a modulated signal transmission apparatus, comprising a signal modulation device comprising:
  at least one data interleaving device according to claim 12.
  at least one OFDM modulator, and
  means for transmitting a signal thus modulated.

19. Telecommunication network, comprising a modulated signal reception apparatus comprising means for receiving a modulated signal and a signal demodulation device comprising:
  at least one OFDM demodulator, and
  at least one data deinterleaving device according to claim 13.

* * * * *

UNITED STATES PATENT AND TRADEMARK OFFICE
CERTIFICATE OF CORRECTION

PATENT NO. : 7,058,005 B2
APPLICATION NO. : 09/969796
DATED : June 6, 2006
INVENTOR(S) : Frédérique Ehrmann-Patin et al.

It is certified that error appears in the above-identified patent and that said Letters Patent is hereby corrected as shown below:

SHEET 3

FIG. 5, "non" should read --no--.

COLUMN 3

Line 46, "HP" should read --$r^{q-p}$--.

COLUMN 7

Lines 13-17, "
$$V = \begin{bmatrix} v_{0,0} & \cdots & v_{N-1,0} \\ \vdots & \ddots & \vdots \\ v_{0,K-1} & \cdots & v_{N-1,K-1} \end{bmatrix}$$
" should read $$-- V = \begin{bmatrix} v_{0,0} & \cdots & v_{N-1,0} \\ \vdots & \ddots & \vdots \\ v_{0,K-1} & \cdots & v_{N-1,K-1} \end{bmatrix} --;$$

Line 29, "$[.]^b$" should read --$[.]^T$--;

Lines 35-44, "
$$\vec{A}\vec{v}_n = \vec{u}_n$$
$$\begin{bmatrix} a_{0,0} & \cdots & a_{0,K-1} \\ \vdots & \ddots & \vdots \\ a_{K-1,0} & \cdots & a_{K-1,K-1} \end{bmatrix} \begin{bmatrix} v_{n,0} \\ \vdots \\ v_{n,K-1} \end{bmatrix} = \begin{bmatrix} u_{n,0} \\ \vdots \\ u_{n,K-1} \end{bmatrix}$$
" should read $$\vec{A}\vec{v}_n = \vec{u}_n$$
$$-- \begin{bmatrix} a_{0,0} & \cdots & a_{0,K-1} \\ \vdots & \ddots & \vdots \\ a_{K-1,0} & \cdots & a_{K-1,K-1} \end{bmatrix} \begin{bmatrix} v_{n,0} \\ \vdots \\ v_{n,K-1} \end{bmatrix} = \begin{bmatrix} u_{n,0} \\ \vdots \\ u_{K-1} \end{bmatrix} --;$$ and

UNITED STATES PATENT AND TRADEMARK OFFICE
CERTIFICATE OF CORRECTION

PATENT NO. : 7,058,005 B2
APPLICATION NO. : 09/969796
DATED : June 6, 2006
INVENTOR(S) : Frédérique Ehrmann-Patin et al.

It is certified that error appears in the above-identified patent and that said Letters Patent is hereby corrected as shown below:

COLUMN 7 (cont'd)

Line 50-55, " $U = \begin{bmatrix} u_{0,0} & \cdots & u_{N-1,0} \\ \vdots & \ddots & \vdots \\ u_{0,K-1} & \cdots & u_{N-1,K-1} \end{bmatrix}$ " should read -- $U = \begin{bmatrix} u_{0,0} & \cdots & u_{N-1,0} \\ \vdots & \ddots & \vdots \\ u_{0,K-1} & \cdots & u_{N-1,K-1} \end{bmatrix}$ --.

COLUMN 9

Line 2, "convention" should read --conventional--.

COLUMN 14

Line 8, "Telecommunication" should read --Telecommunications--.

Signed and Sealed this

Fifteenth Day of May, 2007

JON W. DUDAS
*Director of the United States Patent and Trademark Office*